United States Patent [19]

Rossio et al.

[11] Patent Number: 5,167,884
[45] Date of Patent: Dec. 1, 1992

[54] ENERGY ABSORBING, WATER BLOWN, RIGID POLYURETHANE FOAM

[75] Inventors: Richard C. Rossio, Troy; Mark A. Easterle, Rochester; Michael L. Jackson, Allen Park, all of Mich.

[73] Assignee: BASF Corporation, Parsippany, N.J.

[21] Appl. No.: 856,313

[22] Filed: Mar. 23, 1992

Related U.S. Application Data

[62] Division of Ser. No. 795,453, Nov. 21, 1991.

[51] Int. Cl.⁵ .............................................. C08J 9/34
[52] U.S. Cl. .................... 264/45.5; 521/111; 521/112; 521/174
[58] Field of Search ............... 264/45.5; 521/111, 112, 521/174

[56] References Cited

U.S. PATENT DOCUMENTS 4,883,825 11/1989 Westfall et al. ..................... 521/174
4,970,243 11/1990 Jacobs et al. ....................... 521/174

OTHER PUBLICATIONS

Thompson-Colon, SAE 9109404, "Fundamental Studies of Polyurethane Foam for Energy Absorption in Automotive Interiors".

Primary Examiner—Morton Foelak
Attorney, Agent, or Firm—Martin P. Connaughton

[57] ABSTRACT

The invention relates to energy absorbing, water blown, rigid polyurethane foams. The foams of the present invention are low density, predominantly open celled foams which exhibit a relatively constant consistency of compressive strength over deflection. Such foams are suitable as light weight alternatives in traditional energy absorbing applications.

9 Claims, No Drawings

ENERGY ABSORBING, WATER BLOWN, RIGID POLYURETHANE FOAM

This is a division of application Ser. No. 07/795,453, filed Nov. 21, 1991.

FIELD OF THE INVENTION

The invention relates to energy absorbing rigid polyurethane foam compositions. Specifically these are low density, predominantly open celled, water blown rigid polyurethane foams which exhibit minimal spring back or hysteresis characteristics. Such foams are suitable as lightweight alternatives for traditional energy absorbing applications, such as side impact bolsters in automobile doors. The foams of the present invention exhibit properties comparable to energy absorbing foams using chlorinated fluorocarbons as the blowing agent.

DESCRIPTION OF THE RELATED ART

U.S. Pat. No. 4,866,102 describes moldable energy absorbing rigid polyurethane foam compositions which are prepared by the reaction of a graft polymer dispersion in a polyoxyalkylene polyether polyol with an alkylene oxide adduct of toluenediamine or diaminodiphenylmethane with an organic polyisocyanate in the presence of a crosslinking agent. Similarily, U.S. Pat. No. 4,116,893; 4,190,712; 4,212,954; and 4,282,330 also describe energy absorbing foams utilizing graft polymer dispersions. U.S. Pat. No. 4,722,946 describes the production of energy attenuating viscoelastic polyurethane elastomers and foams, comprising mixtures of linear and branched polyol intermediates, polyisocyanates, and optionally, extenders, blowing agents, and the like, in the presence of a catalyst whereby the isocyanate index is varied from about 65 to about 85. U.S. Pat. No. 4,644,563 describes a method of shoring a geological formation which comprises preparing a rigid polyurethane foam which exhibits nearly constant strain with increasing stress in compression. U.S. Pat. No. 4,696,954 describes the preparation of molded polyurethane foams characterized by high impact strength and good thermal stability. U.S. Pat. No. 4,615,754 describes a high density rigid polyurethane foam which exhibits nearly constant strain with increasing stress in compression. U.S Pat. No. 4,585,807 describes rigid polyurethane foams employing oxyalkylated ethylenediamine.

SUMMARY OF THE INVENTION

The present invention relates to energy absorbing rigid polyurethane foam compositions, the process for preparing said foams and, the resultant articles of manufacture, e.g. side impact bolsters for automotive applications. The foams of the present invention are predominantly open celled, energy absorbing, rigid polyurethane foams essentially- free of chlorinated fluorocarbons and volatile organic carbon blowing agents Yet the foams of the present invention have characteristics, such as constant crush strength and minimal spring back or hysteresis, comparable to present-day energy absorbing rigid polyurethane foams containing fluorocarbons and volatile organic carbons.

DETAILED DESCRIPTION OF THE INVENTION

Under ever increasing governmental regulations addressing both personal safety and environmental concerns auto manufacturers have been put in a position where they must meet stringent impact requirements, maintain vehicle weight and reduce the use of materials having a detrimental effect on the environment. Energy absorbing rigid polyurethane foams have provided a partial solution in some impact performance requirements areas; e.g. energy absorbing fillers which can be used to stiffen door support frames, thus aiding in preserving the structural integrity of the passenger compartment of an automobile or as bolsters which can reduce effects of secondary collision (occupant-to-interior). However, the foams exhibiting the desired impact characteristics utilize chlorinated fluorocarbons as the foaming agent. That fact alone reduces their desirability in light of mandates to reduce and eventually eliminate the use of CFC's.

In the instant invention it has been found that certain water blown rigid polyurethane foams can be produced which exhibit energy absorbing characteristics comparable to the CFC blown rigid polyurethane foams. These foams may be employed in energy absorbing applications, such as side impact bolsters in automobiles.

These foams are predominantly open celled; having molded densities ranging from 2.0 pcf to about 4.5 pcf, and a crush strength which remains constant from about 10% to about 70% in loading of up to about 70 psi.

Previously, the foams exhibiting the desired impact characteristics utilized chlorinated fluorocarbons as the foaming agent. Attempts to substitute water into these formulations failed to produce foams exhibiting the same impact characteristics. Some success has been had with certain narrowly defined formulations using water as the blowing agent, and containing a polymer polyol (graft polyol) as necessary elements of the invention. (See co-pending application U.S. Ser. No. 634,643 filed Dec. 27, 1990, also U.S Pat. Nos. 4,190,712; 4,212,954 and 4,116,893).

Surprisingly, it has now been found that foams exhibiting the desired energy absorbing characteristics may be produced from active hydrogen containing compounds or mixtures thereof, organic isocyanates, water, and additives with the proviso that such compounds are generally capable of forming a rigid polyurethane structure, the critical nature of the invention being the amount of water used in conjunction with the isocyanate and resin portions of a given rigid polyurethane foam formulation. The water must be present in amounts sufficient to act as a blowing agent and a cell opening agent promoting a predominantly open cell structure, yet not be present in amounts great enough to cause the foam to collapse. The amount of water used is highly dependent upon the other formulation components but it has been found that from about 2 weight percent to about 30 weight percent is an effective range. A preferred range of water being from about 6 weight percent to about 15 weight percent.

The polyisocyanates which may be used in the present invention are modified and unmodified polyisocyanates which are well known to those skilled in the art. For the purposes of this invention the term polyisocyanate is used to describe compounds containing, at least two isocyanate groups. Unmodified polyisocyanates include aliphatic or cycloaliphatic and aromatic polyisocyanates. Examples include 2,4- and 2,6-methylcyclohexylenediisocyanate; tetramethylene diisocyanate, cyclohexane diisocyanate, 2,4-toluene diisocyanate, 2,6 toluene diisocyanate, mixtures of 2,4- and 2,6-toluene diisocyanate, naphthalene-1,5-diisocyanate, 1-methoxyphenyl-2,4-diisocyanate. Preferred isocyanates include 4,4'-diphenylmethane diisocyanate (MDI), mixtures of 4,4'- and 2,4-diphenylmethane diisocyanate, and polymeric polyisocyanates such as polymethylene polyphenylenes polyisocyanates (polymeric MDI). Included within the preferred isocyanates are those modified MDI's containing carbodiimide, allophanate, urethane or isocyanurate structures. The more preferred isocyanates are polymeric MDI and mixtures of polymeric MDI and pure 2,4 and 4,4' MDI. These polyisocyanates are prepared by conventional methods known in the art, e.g. phosgenation of the corresponding organic amine.

For purposes of the present invention isocyanates other than the preferred isocyanates may be present in minor amounts.

In the preparation of the polyurethanes of the present invention the isocyanate is reacted with active hydrogen-containing compounds (polyols are preferred) Hydroxyl group-containing compounds (polyols) useful in the preparation of polyurethanes are described in the *Polyurethane Handbook* in chapter 3, §3.1 pages 42–61; and in *Polyurethanes: Chemistry and Technology* in Chapter II, §§III and IV, pages 32–47. Many hydroxyl-group containing compounds may be used, including simple aliphatic glycols, dihydroxy aromatics, bisphenols, and hydroxyl-terminated polyethers, polyesters, and polyacetals, among others. Extensive lists of suitable polyols may be found in the above references and in many patents, for example in columns 2 and 3 of U.S. Pat. No. 3,652,639; columns 2–6 of U.S. Pat. No. 4,421,872; and columns 4–6 of U.S. Pat. No. 4,310,632; these three patents being hereby incorporated by reference.

Preferably used are hydroxyl-terminated polyoxyalkylene polyols. The former are generally prepared by well known methods, for example by the base catalyzed addition of an alkylene oxide, preferably ethylene oxide (oxirane), propylene oxide (methyloxirane) or butylene oxide (ethyloxirane) to an initiator molecule containing on the average two or more active hydrogens. Examples of preferred initiator molecules are dihydric initiators such as ethylene glycol, propylene glycol, butylene glycol, neopentyl glycol, 1,6-hexanediol, hydroquinone, resorcinol, the bisphenols, aniline and other aromatic monoamines, aliphatic monoamines, and monoesters of glycerine; trihydric initiators such as glycerine, trimethylolpropane, trimethylolethane, N-alkylphenylenediamines, mono, di, and trialkanolamines; tetrahydric initiators such as ethylene diamine, propylene diamine, 2,4, 2,2', and 4,4'-methylenedianiline, toluenediamine, and pentaerythritol; pentahydric initiators such as diethylenetriamine; and hexahydric and octahydric initiators such as sorbitol and sucrose.

Addition of alkylene oxide to the initiator molecules may take place simultaneously or sequentially when more than one alkylene oxide is used, resulting in block, heteric, and block-heteric polyoxyalkylene polyethers The number of hydroxyl groups will generally equal the number of active hydrogens in the initiator molecule. Processes for preparing such polyethers are described both in the *Polyurethane Handbook and Polyurethanes: Chemistry and Technology* as well as in many patents, for example U.S. Pat. Nos. 1,922,451; 2,674,619; 1,922,459; 3,190,927; and 3,346,557.

Polyester polyols also represent polyurethane-forming reactants. Such polyesters are well known in the art and are prepared simply by polymerizing polycarboxylic acids or their derivatives, for example their acid chlorides or anhydrides, with a polyol. Numerous polycarboxylic acids are suitable, for example malonic acid, citric acid, succinic acid, glutaric acid, adipic acid, pimelic acid, azelaic acid, sebacic acid, maleic acid, fumaric acid, terephthalic acid, and phthalic acid Numerous polyols are suitable, for example the various aliphatic glycols, trimethylolpropane and trimethylolethane, a-methylglucoside, and sorbitol. Also suitable are low molecular weight polyoxyalkylene glycols such as polyoxyethylene glycol, polyoxypropylene glycol, and block and heteric polyoxyethylene-polyoxypropylene glycols. These lists of dicarboxylic acids and polyols are illustrative only, and not limiting. An excess of polyol should be used to ensure hydroxyl termination. Although carboxyl groups are also reactive with isocyanates. Methods of preparation of such polyester polyols are given in the *Polyurethane Handbook and in Polyurethanes: Chemistry and Technology*.

These polyols may be used alone or in combination. However, the use of graft polymer dispersions either alone or in combination is not contemplated by this invention. Those polyols or mixtures of polyols selected should promote a high crosslink density for optimal results.

Any suitable catalyst or mixture of catalysts may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropy propylenediamine, 3-diethylaminopropyldiethylamine, dimethylbenzylamine, and the like. Other suitable catalysts are, for example, stannous chloride, dibutyltin-di-2-ethyl hexonate, potassium hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous surface-active agents have been found satisfactory. Nonionic surface active agents are preferred. Of these, the nonionic surface-active agents such as the well-known silicones have been found particularly desirable Other surface-active agents which are operative, although not preferred, include polyethylene glycol ethers of long chain alcohols, tertiary amine or alkanol amine salts of long chain alkyl acid sulfate esters, alkyl sulfonic esters, and alkyl arylsulfonic acids A chain extender and/or crosslinker is used as well in the present invention. These include those compounds having at least two functional groups bearing active hydrogen atoms such as, hydrazine, primary and secondary diamines, amino alcohols, amine acids, hydroxy acids, glycols or mixtures thereof Glycerin is an example of a preferred compound used as a crosslinker.

Other optional additives which fall within the spirit of the present invention include known pigments, such as carbon black, dyes, stabilizers against aging and weathering, fungistats, bacteriostats, fillers, or flame retarding agents.

If desired, flame retardants may be incorporated in the foams. Among the flame retardants which may be employed are: pentabromodiphenyl oxide, dibromopropanol, tris($\beta$-chloropropyl)phosphate, 2,2-bis(-bromoethyl) 1,3-propanediol, tetrakis(2-chloroethyl)ethylene diphosphate, tris(2,3-dibromopropyl)phosphate, tris($\beta$-chloroethyl)phosphate, tris(1,2-dichloropropyl)phosphate, bis-(2-chloroethyl) 2-chloroethylphosphonate, molybdenum trioxide, ammonium molybdate, ammonium phosphate, pentabromodiphenyl oxide, tricresylphosphate, hexabromocyclododecane and dibromoethyl dibromocyclohexane.

The following examples illustrate the nature of the invention. All parts are weight % unless otherwise indicated.

Examples 1-3 and comparative examples A and B were prepared using the following conditions:

| Processing Conditions | |
|---|---|
| Machine | High Pressure |
| Component Temp | |
| Resin °F. | 77 |
| Isocyanate °F. | 77 |
| Mixing Pressure | |
| Resin (bar) | 180 |
| Isocyanate (bar) | 180 |
| Throughput g/sec | 175 |
| Mold Temperature °F. | 100 ± 5 |
| Mold Release | Wax base release agent* |
| Processing Mode | Open Mold Pour |
| Demold Time min | ~3 |

*Silicone was used as the mold release for comparative examples A and B.

Examples 1-3 and Comparative example A and B were injected into the center of a preheated 10×10×2.5" mold. The mold was closed. The parts were demolded, cured at 50% humidity and 73° F. prior to testing. Foam compression testing (ASTM D-1621) at 10 percent intervals was carried out on all examples at varying full weights, to determine foam performance characteristics. Comparative example A is a currently used energy absorbing foam composition using Freon F-11a (a chlorinated fluorocarbon). Comparative example B is a formulation similar to comparative example A however water is substituted for F-11a.

Although these parts were made using an open mold pour technique, the system is equally amenable to other fabrication methods known to those skilled in the art, e.g. RIM (reaction injection molding).

Polyol A was a propylene oxide adduct of a sucrose/-dipropylene glycol mixed initiator, having a molecular weight of about 620 and a hydroxyl number of about 397.

Polyol B was a propylene oxide adduct of ethylene diamine having a molecular weight of about 293, and a hydroxyl number of 767.

Polyol C was a propylene oxide adduct of a mixture of toluene diamine isomers containing predominantly vicinal isomers. having a molecular weight of about 570 and a hydroxyl number of about 390.

Polyol D was a propylene oxide adduct of propylene glycol containing 50 percent of 2.1 acrylonitrile/styrene, having a hydroxyl number of about 69.

DC 193 was a silicone surfactant sold by Dow Corning.

TEGOSTAB B-4113 was a silicone surfactant sold by Goldschmidt.

NIAX L-540 was a silicone surfactant sold by Union Carbide.

NIAX C-174 was an amine catalyst sole by Union Carbide.

DABCO R-8020 was an amine catalyst sold by Air Products.

DAECO 33LV was an amine catalyst sold by Air Products.

POLYCAT 5 was an amine catalyst sold by Air Products.

HexChem 977 was an organometallic catalyst, potassium octoate, in dipropylene glycol.

FOMREZ UL-1 was a tin catalyst sold by Fomrez Corp.

F11A was a chlorinated fluorocarbon sold by Dupont Corporation.

ISO A was a polymeric polymethylene polyphenyl isocyanate having a functionality of about 2.7.

All reported test values are averages of multiple on each sample.

| | Examples | | | | |
|---|---|---|---|---|---|
| Resin Component | 1 | 2 | 3 | A | B |
| Polyol A | 82.5 | 83.39 | — | — | — |
| Polyol B | — | — | 67.0 | — | — |
| Polyol C | — | — | — | 21.56 | 29.29 |
| Polyol D | — | — | — | 30.81 | 41.84 |
| DC-193 | 0.41 | 0.41 | — | — | — |
| Tegostab B-4113 | — | — | 0.4 | — | — |
| Niax L-540 | — | — | — | 0.49 | 1.25 |
| Niax C-174 | — | — | — | — | 2.1 |
| DABCO R-8020 | — | — | — | 0.92 | — |
| DABCO 33LV | — | — | 0.6 | — | — |
| Polycat 5 | 0.5 | 0.5 | — | — | — |
| Hexchem 977 | 0.83 | 0.83 | 2.0 | — | — |
| Fomrez UL-1 | — | — | — | 0.02 | — |
| Glycerin | 8.26 | 8.26 | 15.0 | 9.24 | 12.55 |
| Water | 7.44 | 6.61 | 15.0 | — | 12.55 |
| F-11A | — | — | — | 36.96 | — |
| Isocyanate Component | | | | | |
| Iso A | 200 | 200 | 200 | 89.3 | 119.5 |

TABLE 1

| Example | Density (pcf) Molded/Core | Strength at Yield (psi) | STRENGTH AT 10% CRUSH (psi) | STRENGTH AT 20% CRUSH (psi) | STRENGTH AT 30% CRUSH (psi) | STRENGTH AT 40% CRUSH (psi) |
|---|---|---|---|---|---|---|
| 1 | 3.15/2.20 | 22.66 | 22.97 | 24.33 | 26.46 | 27.98 |
| 1 | 3.4/2.44 | 25.96 | 26.32 | 27.37 | 28.86 | 29.75 |
| 1 | 3.67/2.58 | 32.94 | 32.84 | 33.29 | 33.88 | 34.40 |
| 1 | 3.81/2.88 | 35.05 | 35.20 | 36.50 | 37.08 | 37.98 |
| 1 | 4.09/3.13 | 38.12 | 38.13 | 36.77 | 36.54 | 37.76 |
| 1 | 4.38/3.30 | 50.78 | 50.21 | 50.47 | 50.21 | 50.84 |

| Example | STRENGTH AT 50% CRUSH (psi) | STRENGTH AT 60% CRUSH (psi) | STRENGTH AT 70% CRUSH (psi) | STRENGTH AT 80% CRUSH (psi) |
|---|---|---|---|---|
| 1 | 29.03 | 30.07 | 30.66 | 64.53 |
| 1 | 30.73 | 32.05 | 31.57 | 69.84 |
| 1 | 35.17 | 36.21 | 38.25 | 86.18 |
| 1 | 39.30 | 40.45 | 40.43 | 92.28 |
| 1 | 38.82 | 40.13 | 44.08 | 100.30 |

TABLE 1-continued

| | | | | | |
|---|---|---|---|---|---|
| | 1 | 51.49 | 53.29 | 56.35 | 129.5 |

TABLE 2

| Example | Density (pcf) Molded/Core | Strength at Yield (psi) | STRENGTH AT 10% CRUSH (psi) | STRENGTH AT 20% CRUSH (psi) | STRENGTH AT 30% CRUSH (psi) | STRENGTH AT 40% CRUSH (psi) |
|---|---|---|---|---|---|---|
| 2 | 2.78/2.37 | 27.39 | 25.92 | 27.14 | 27.20 | 27.98 |
| 2 | 3.12/2.21 | 36.92 | 36.41 | 38.41 | 38.55 | 39.25 |
| 2 | 3.33/2.88 | 41.72 | 40.61 | 41.75 | 41.60 | 41.68 |
| 2 | 3.49/3.04 | 46.10 | 46.45 | 48.12 | 48.09 | 48.75 |
| 2 | 3.73/3.26 | 53.74 | 53.17 | 55.56 | 54.19 | 54.40 |
| 2 | 3.99/3.51 | 62.04 | 62.73 | 62.25 | 61.32 | 61.72 |

| Example | STRENGTH AT 50% CRUSH (psi) | STRENGTH AT 60% CRUSH (psi) | STRENGTH AT 70% CRUSH (psi) | STRENGTH AT 80% CRUSH (psi) |
|---|---|---|---|---|
| 2 | 28.86 | 29.25 | 39.53 | 72.34 |
| 2 | 39.97 | 41.33 | 46.45 | 94.64 |
| 2 | 42.71 | 44.40 | 50.78 | 104.5 |
| 2 | 50.36 | 52.04 | 54.86 | 116.3 |
| 2 | 55.61 | 57.40 | 61.76 | 134.5 |
| 2 | 62.84 | 65.26 | 68.05 | 152.2 |

TABLE 3

| Example | Density (pcf) Molded/Core | Strength at Yield (psi) | STRENGTH AT 10% CRUSH (psi) | STRENGTH AT 20% CRUSH (psi) | STRENGTH AT 30% CRUSH (psi) | STRENGTH AT 40% CRUSH (psi) |
|---|---|---|---|---|---|---|
| 3 | 3.39/2.03 | 8.4 | 9.1 | 9.6 | 10.4 | 11.6 |
| 3 | 3.94/2.37 | 16.7 | 14.8 | 14.6 | 14.6 | 15.6 |

| Example | STRENGTH AT 50% CRUSH (psi) | STRENGTH AT 60% CRUSH (psi) | STRENGTH AT 70% CRUSH (psi) | STRENGTH AT 80% CRUSH (psi) |
|---|---|---|---|---|
| 3 | 13.5 | 14.6 | 15.7 | 17.1 |
| 3 | 16.9 | 18.2 | 19.2 | 27.0 |

TABLE 4

Comparative Examples A & B

| Example | Core Density 2.5–2.8 (pcf) | Strength at Yield (psi) | STRENGTH AT 10% CRUSH (psi) | STRENGTH AT 20% CRUSH (psi) | STRENGTH AT 30% CRUSH (psi) | STRENGTH AT 40% CRUSH (psi) |
|---|---|---|---|---|---|---|
| A | | 17.84 | 16.57 | 15.10 | 15.70 | 16.34 |
| B | | — | 37.46 | 39.80 | 42.40 | 45.77 |

| Example | STRENGTH AT 50% CRUSH (psi) | STRENGTH AT 60% CRUSH (psi) | STRENGTH AT 70% CRUSH (psi) | STRENGTH AT 80% CRUSH (psi) |
|---|---|---|---|---|
| A | 17.37 | 19.18 | 26.92 | 85.59 |
| B | 51.40 | 61.77 | 80+ | 100+ |

TABLE 5

| Example | Fill Weight (grams) | Strength at Yield (psi) | STRENGTH AT 10% CRUSH (psi) | STRENGTH AT 20% CRUSH (psi) | STRENGTH AT 30% CRUSH (psi) | STRENGTH AT 40% CRUSH (psi) |
|---|---|---|---|---|---|---|
| 1 | 263 | 20.8 | 19.9 | 21.4 | 23.3 | 25.1 |
| 1 | 276 | 26.3 | 25.9 | 27.8 | 29.5 | 31.3 |
| 1 | 300 | 30.5 | 30.0 | 32.1 | 34.0 | 36.1 |
| 1 | 314 | 38.8 | 39.0 | 37.0 | 37.0 | 38.1 |
| 1 | 352 | 57.4 | 51.2 | 50.0 | 50.7 | 52.1 |

| Example | STRENGTH AT 50% CRUSH (psi) | STRENGTH AT 60% CRUSH (psi) | STRENGTH AT 70% CRUSH (psi) | STRENGTH AT 80% CRUSH (psi) |
|---|---|---|---|---|
| 1 | 26.9 | 28.2 | 33.6 | 67.4 |

TABLE 5-continued

| | | | | |
|---|---|---|---|---|
| 1 | 32.9 | 34.3 | 43.45 | 86.5 |
| 1 | 37.8 | 39.6 | 47.2 | 96.0 |
| 1 | 39.3 | 42.8 | 53.3 | 105.64 |
| 1 | 55.4 | 59.9 | 69.7 | 137.2 |

Examples 1, 2 and 3 illustrate the present invention. Examples 1 and 2 are prepared using the same formulation with different amounts of water present. The resulting foams exhibit the desired characteristics of the invention, i.e. a relatively constant consistency of compressive strength or crush strength, over deflection (ASTM D-1621). This consistency of compressive strength is carried over a range of densities as shown in tables 1 and 2. Example 3 illustrates that energy absorbing rigid foams are possible by adjusting the amount of water necessary to produce foams having the desired physical characteristics.

Table 3 shows the results of ASTMD-1621 foam compression tests for foams produced from example 3.

Table 4 shows the results of ASTM D-1621 foam compression test for comparative examples A and B. As is evident from the data merely substituting water (Ex. B) for a chlorinated fluorocarbon (Ex. B) in a formulation produces a foam which exhibits a significant loss in efficiency, i.e. consistency of compressive strength over deflection.

Table 5 shows test data from a prototype hip bolster part, covering the range of 20 to 50 psi by varying the fill weight. The hip bolster was prepared using the formulation from example 1. All conditions were the same as those for examples 1 through 3 with the exception that a hip bolster mold was used.

We claim:

1. An energy absorbing polyurethane foam, comprising the reaction product of:
   A) a compound containing isocyanate reactive hydroxyl groups selected from the group consisting of aliphatic glycols, dihydroxy aromatics, bisphenols, hydroxyl terminated polyethers, polyesters, polyacetals and mixtures thereof,
   B) an organic isocyanate selected from the group consisting of 4,4'-diphenylmethane diisocyanate, polymethylene polyphenylene polyisocyanate, modified diphenylmethane diisocyanates, and mixtures thereof, wherein other organic isocyanates may be present in minor amounts,
   C) a catalyst,
   D) a blowing agent consisting of water, wherein the water is present in amounts sufficient to cause formation of a predominantly open cell foam, without causing collapse,
   E) a surfactant, and
   F) a crosslinker, wherein said reaction product has a molded density of from about 2.0 pcf to about 4.5 pcf and a crush strength which remains constant from about 10 percent to about 70 percent deflection at loads less than 70 psi.

2. A composition as claimed in claim 1, wherein the compound containing isocyanate reactive hydroxyl groups is a hydroxyl-terminated polyoxyalkylene polyol.

3. A composition as claimed in claim 1, wherein the compound containing the isocyanate reactive group is a propylene oxide adduct of a sucrose/dipropylene glycol mixed initiator having a molecular weight of about 620 and a hydroxyl number of about 400.

4. A composition as claimed in claim 1, wherein the isocyanate is a polymeric polymethylene polyphenylisocyanate.

5. A composition as claimed in claim 1, wherein the surfactant is a silicone surfactant.

6. A composition as claimed in claim 1, wherein the crosslinker is a glycerin.

7. A composition as claimed in claim 1, wherein the water is present in amounts from about 2 wt.% to about 30 wt.%.

8. A composition as claimed in claim 9 wherein the water is present in amounts from about 6 wt.% to about 15 wt.%.

9. An energy absorbing rigid polyurethane foam article having a molded density of from about 2.0 pcf to about 4.5 pcf and a consistency of compressive strength from 10% to 70% deflection at loading of up to about 70 psi, comprising the reaction product of;
   A) a polymethylene polyphenylisocyanate having a functionality of about 2.7,
   B) A $C_2$-$C_4$ alkylene oxide adduct of an initiator selected from a group consisting of sucrose, dipropylene glycol and mixtures thereof,
   C) a catalyst,
   D) from about 6 wt.% to about 15 wt.% water,
   E) a silicone surfactant, and
   F) glycerin.

* * * * *